Jan. 6, 1959   W. W. SIMMONDS ET AL   2,867,411
WEIGHT CONTROL UNIT FOR ROTARY DRILLING RIGS
Filed Sept. 26, 1956   7 Sheets-Sheet 4

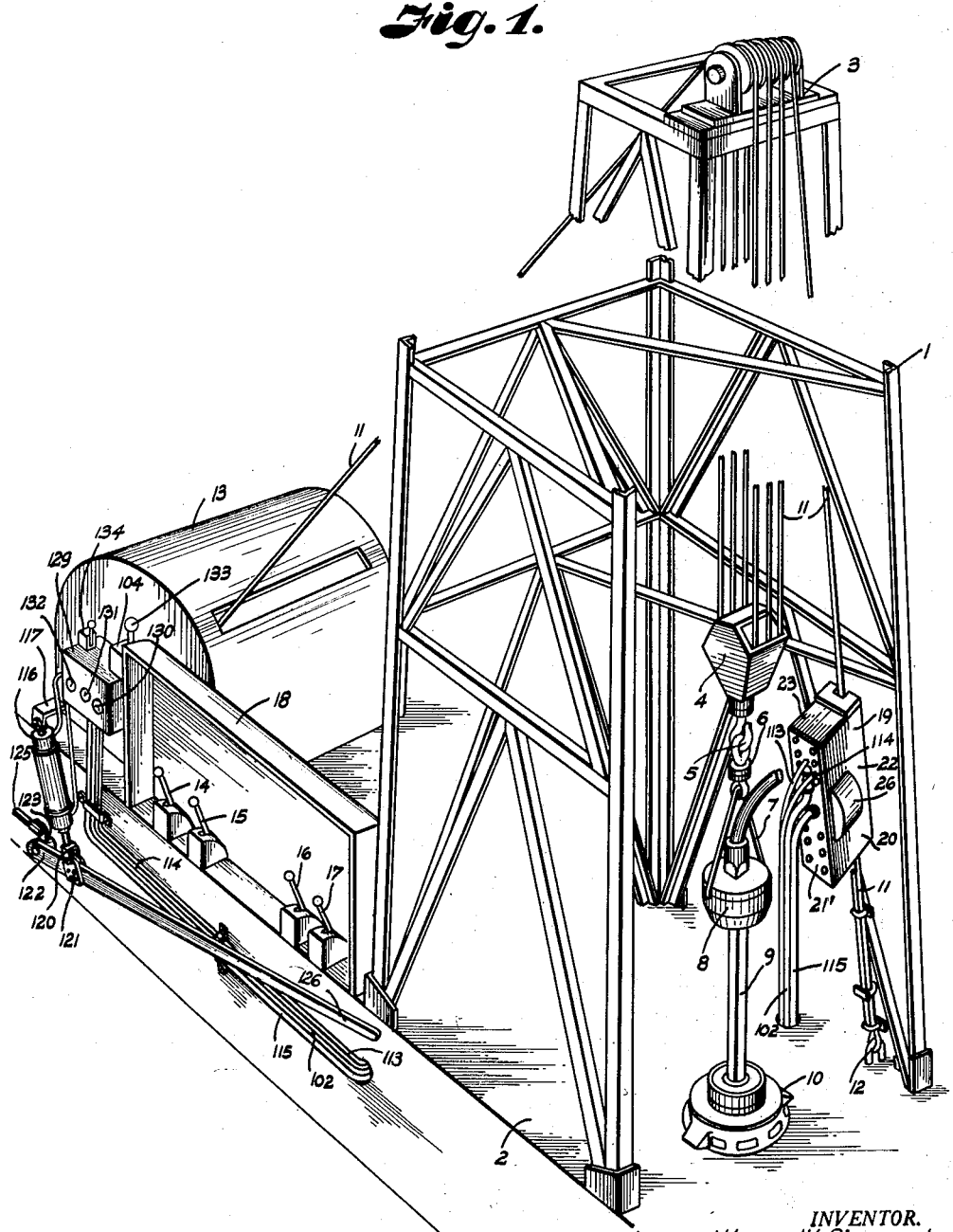

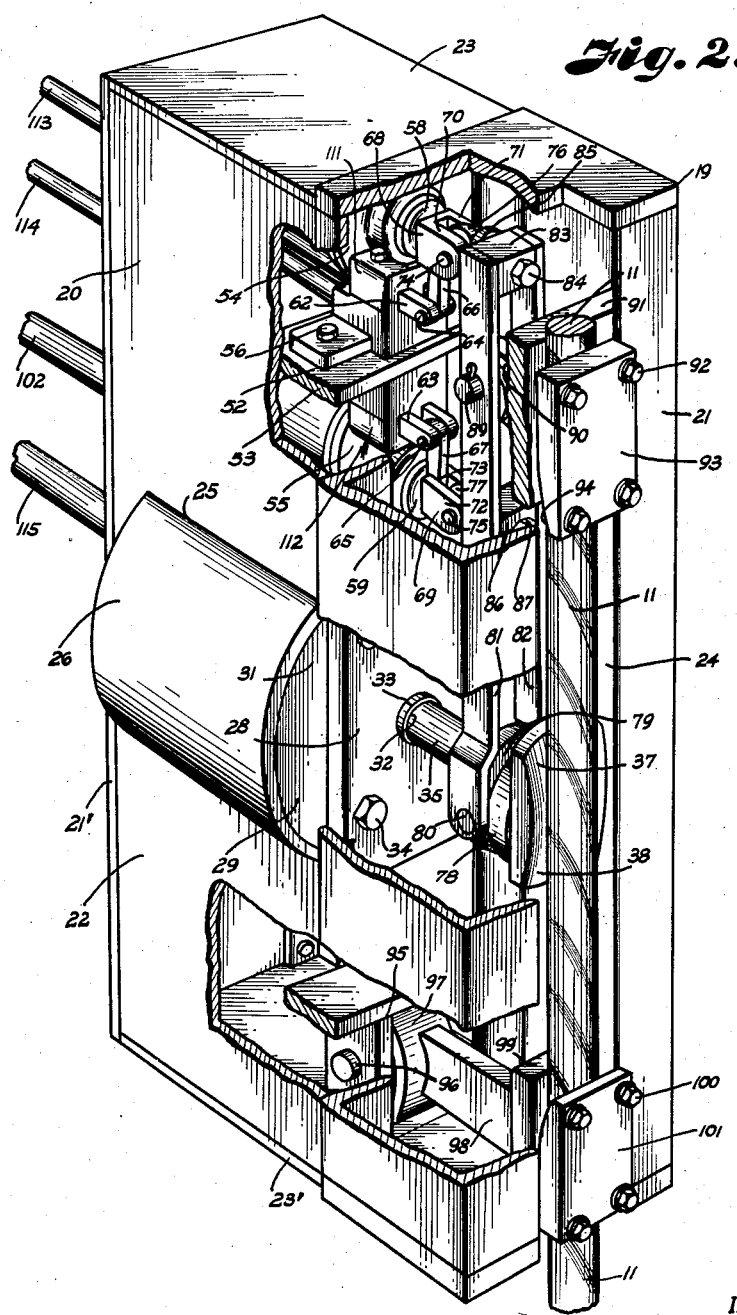

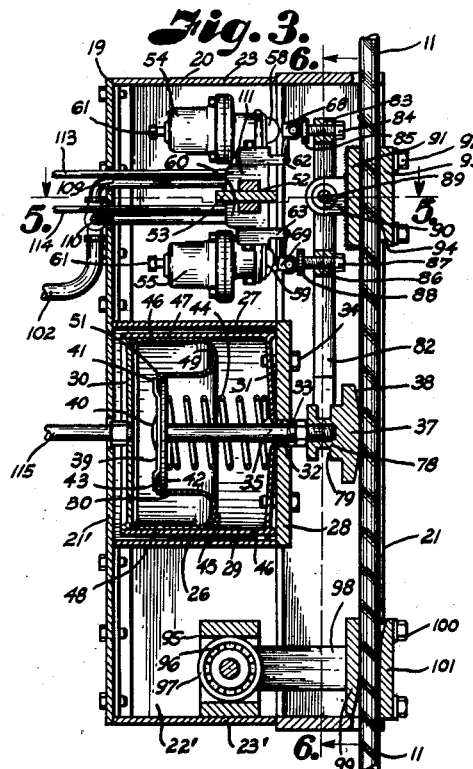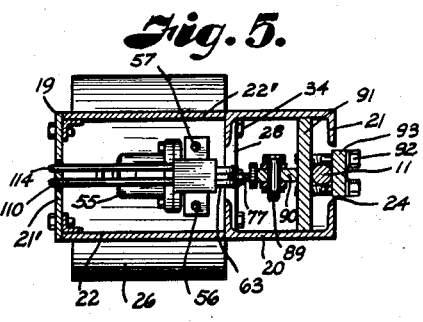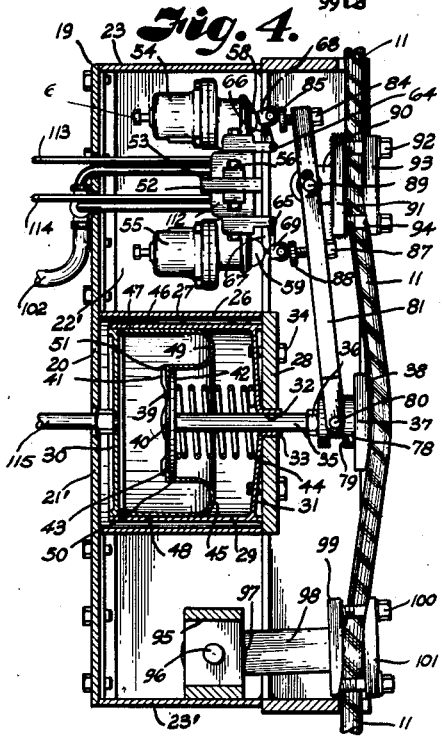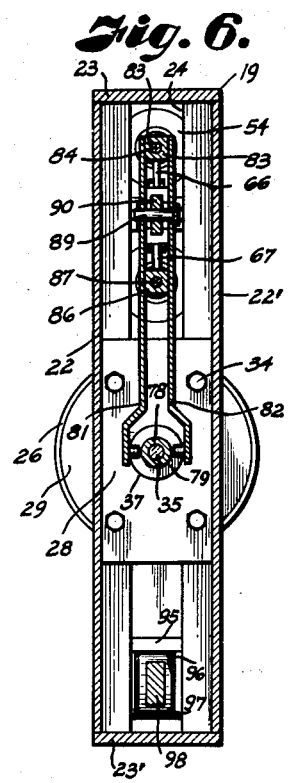

TO BRAKE MEANS

INVENTOR.
Wayne W. Simmonds and
BY  Arlie J. Simmonds.

ATTORNEYS.

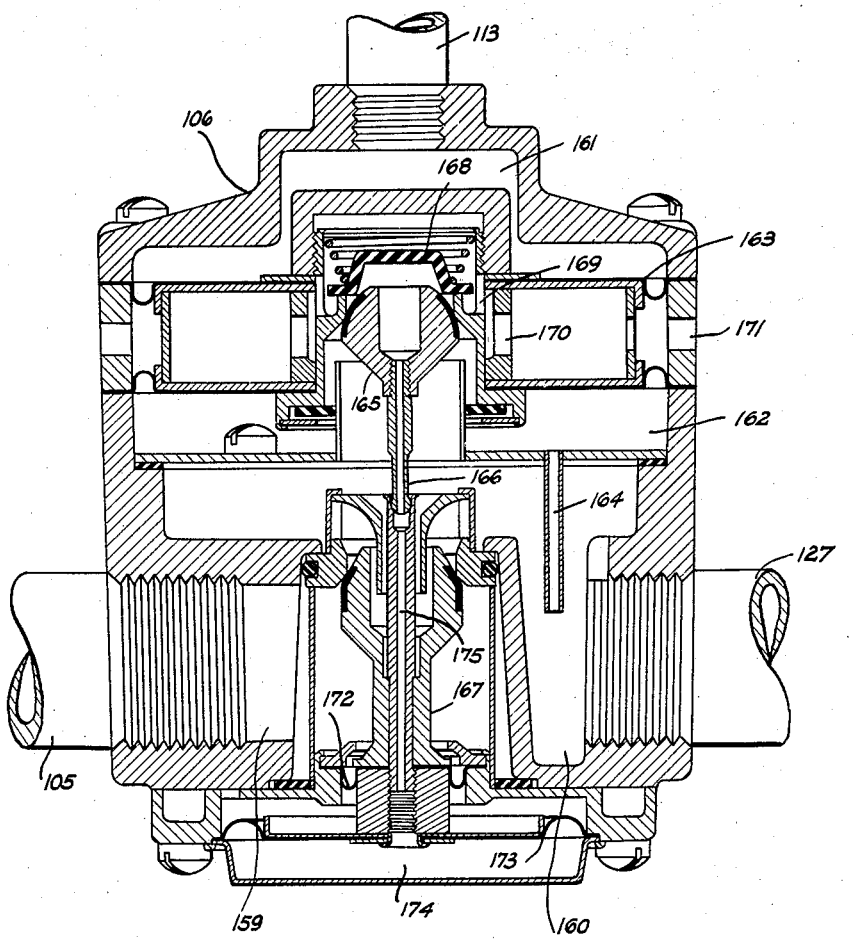

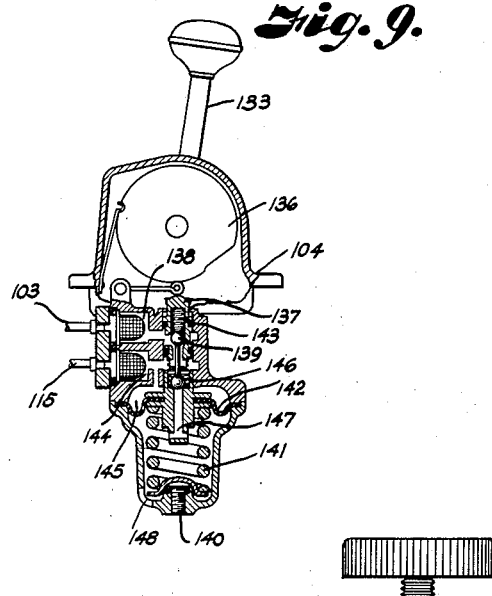
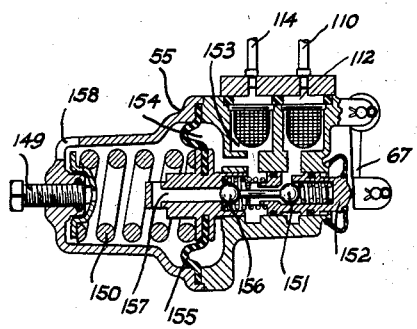
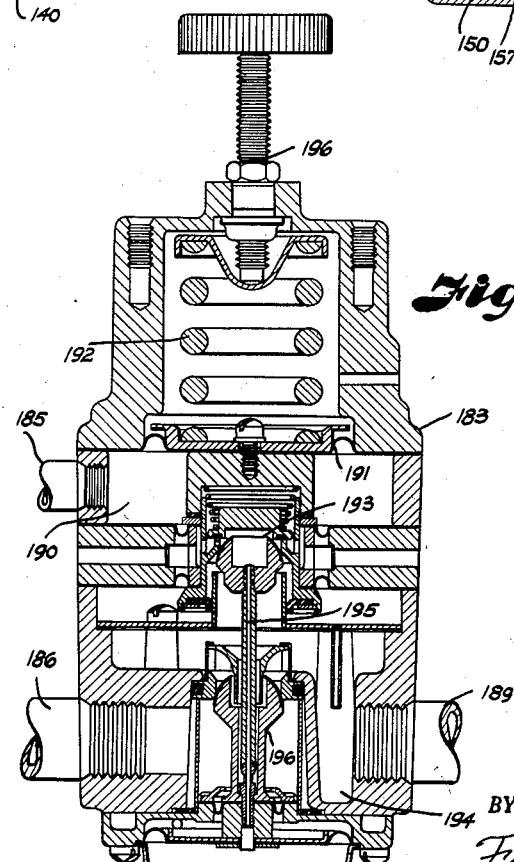
INVENTOR.
Wayne W. Simmonds and
Arlie J. Simmonds.
BY Fishburn and Gold
ATTORNEYS.

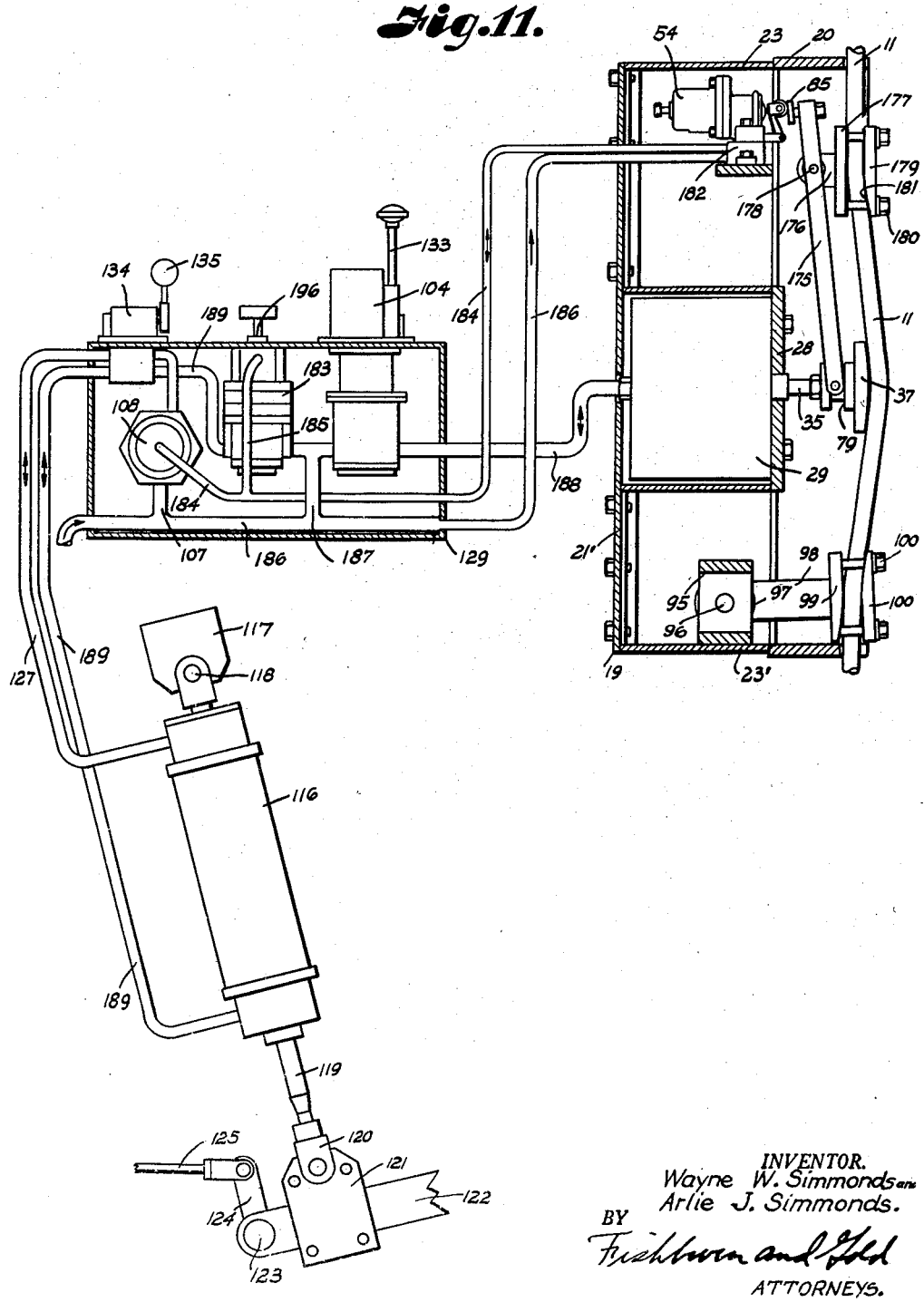

United States Patent Office 2,867,411
Patented Jan. 6, 1959

2,867,411

WEIGHT CONTROL UNIT FOR ROTARY DRILLING RIGS

Wayne W. Simmonds, Tulsa, Okla., and Arlie J. Simmonds, Glendale, Calif., assignors to John H. Lucas, trustee for said Wayne W. Simmonds and said Arlie J. Simmonds Application September 26, 1956, Serial No. 612,309

4 Claims. (Cl. 254—173)

This invention relates to weight control units for rotary drilling rigs, and more particularly to control units to automatically feed the cable for drill tools to a well hole during drilling operations.

The principal objects of the present invention are to provide fluid controlled apparatus for automatically feeding of the drilling cable to the well hole with the tools thereon so that when the drill bit cuts away the formation the line will be payed out from the winding drum automatically; to provide a control unit having a diaphragm cylinder provided with a piston and a head on the piston for engaging the cable of the drilling tools operated by fluid pressure through control valves so that as the formation is cut away the line or cable will be unwound from the cable drum in order to keep a constant weight of the drill stem and drill bit on the formation during the drilling operation; to provide the control unit with air control valves for engagement with the cable through a link arrangement pivoted on an arm connected to the diaphragm cylinder to operate pressure regulating relay valves; to provide a clamp for the cable on the side of the diaphragm cylinder adjacent the control valves rigidly mounted to a housing; to provide a clamp arrangement on the other side of the diaphragm rotatably mounted within the housing so that when the diaphragm cylinder piston plunger is operated to move the cable the clamping device will rotate on its mountings; and to provide for automatically braking the cable from the cable drum through the control valves.

Other objects of the present invention are to provide a master control valve or pressure regulator for setting the pressure in the diaphragm cylinder; to provide relay valves in the main air line and the lines leading to the control valves having connection with a brake operating cylinder for controlling the brake of a cable drum to hold and pay out the cable from the cable drum; and to provide for control of all of the valves from the floor of the derrick structure.

Still further objects of the present invention are, to provide a device of this character having one reversing relay valve and one control valve for the brake cylinder; and to provide apparatus for operation of the diaphragm cylinder with one main air line and the operation of the braking cylinder through pneumatic pressure.

In accomplishing these and other objects of our invention, we have provided improved details of structure, the preferred forms of which are illustrated in the accompanying drawings, wherein:

Fig. 1 is a perspective view of a derrick, a drilling rig, embodying the features of our invention, particularly illustrating the control unit attached to the cable.

Fig. 2 is an enlarged perspective view of the weight control unit with parts broken away to better illustrate the apparatus.

Fig. 3 is a vertical cross sectional view through the weight control unit showing the diaphragm cylinder in position for partial release of the brake for feeding of the cable from the cable drum.

Fig. 4 is a view similar to Fig. 3 but with the diaphragm cylinder in the position when the brake is being applied to the cable drum.

Fig. 5 is a cross sectional view taken on a line 5—5, Fig. 3.

Fig. 6 is a vertical cross sectional view taken on a line 6—6, Fig. 3.

Fig. 8 is a diagrammatic sectional view through a suitable conventional relay or pressure amplifier valve.

Fig. 9 is a diagrammatic sectional view through a suitable conventional master pressure regulator valve.

Fig. 10 is a diagrammatic sectional view through suitable conventional control valve.

Fig. 11 is a diagrammatic view of the control unit with the valve assembly and the brake operating cylinder with only one control valve.

Fig. 12 is a diagrammatic sectional view through a suitable conventional reversing relay or pressure amplifier valve.

Figure 7:
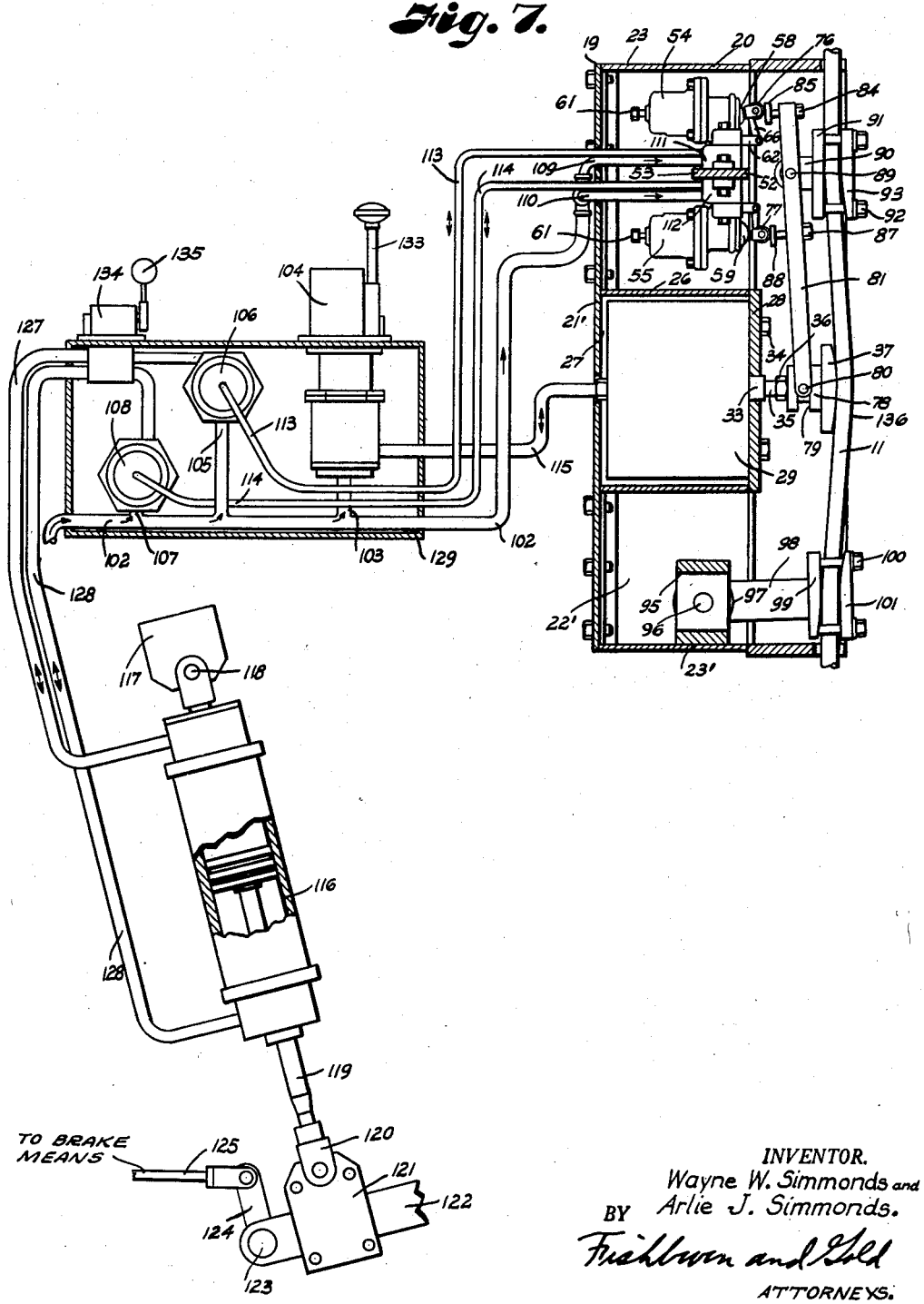
Fig. 7 is a diagrammatic view of the control unit in neutral position and of the valve assembly and the brake operating cylinder.

Referring more in detail to the drawings:

1 designates a derrick in connection with which our invention is adapted to be used and which includes a platform 2 on which the derrick is mounted, a crown block 3, traveling block 4 having a hook 5 attached to a swivel 6 which in turn is attached to a bail 7 of a swivel head 8 connected to the drill stem 9 to which the drill bit (not shown) is attached. 10 designates a turntable usually employed with apparatus of this character. A cable 11 has one end dead ended as for example by being attached to the derrick floor 2 as indicated at 12 (Fig. 1). The cable extends upwardly from the dead end and is reeved over the traveling and crown blocks 3 and 4 and has its other end portion wound on and the end secured to a cable drum (not shown) in a drum housing 13 also mounted upon the derrick floor provided with the usual operating levers 14, 15, 16 and 17 mounted upon a valve rack or board 18 as is common practice.

The weight control unit proper (Fig. 2) is designated generally at 19 comprising a housing 20 having a front 21, back 21', sides 22 and 22', a top 23 and bottom 23'. The front wall 21 has a longitudinal opening 24 and mounted between the sides 22 and 22' and partly extending therethrough as at 25 is a cylindrical housing 26 providing a chamber 27 closed at its front side by a plate 28 for housing a diaphragm cylinder as indicated at 29 (Fig. 3). The rear end of the diaphragm cylinder 29 is closed by a plate 30. The forward end of the diaphragm cylinder 29 has a plate 31 having a central opening 32 defined by a boss or sleeve 33. The plate 31 has spaced openings for receiving bolts or the like 34 for holding the cylinder 29 in place on the plate 28 and within the housing 26.

A shaft or bolt 35 is slidably mounted in the opening 32 of the plate 31 and has its outer end threaded to receive a nut 36 and a cable engaging head 37 having a slightly rounded face 38 as illustrated in Fig. 3. The shaft of the bolt 35 extends inwardly in the cylinder 29 and a plate 39 is held thereon by the head 40 of the bolt. The plate 39 has an annular flange 41 offset slightly from the body of the plate and a washer 42 is engaged against the plate forming a space 43 between the washer and plate on the outer annular rim. A coil spring 44 has one end bearing against the washer 42 and its other end against the plate 31.

A flexible diaphragm 45 is provided in the cylinder 29 and has its annular periphery sealingly secured to the inside of the wall 46 of the cylinder adjacent the plate 30 as indicated at 47 and 48 (Fig. 3). The diaphragm extends toward the plate 31 and then curves inwardly and rearwardly as indicated at 49 forming a cylindrical portion 50 having an inturned annular flange 51 sealingly engaging in the space 43 between the plate 39 and washer 42.

Mounted within the housing 20 of the control unit is a frame work generally indicated at 52 (Fig. 3) including a horizontal plate 53 secured to the sides 22 and 22'. Mounted upon the horizontal plate 53 are control valves 54 and 55, the valves preferably being mounted substantially in a vertical line and respectively above and below the plate 53 by bolts or the like 56 and 57. The control valves 54 and 55 may be any suitable structure. An example of such a suitable conventional valve is an automatic pressure reducing valve of the lever operated type as illustrated in Fig. 10. The valve structure per se is not a part of the present invention. The control valves serve air to graduated pressure regulating relay valves to operate the same as later described. Ends 58 and 59 respectively of the valves 54 and 55 extend towards the opening 24 in the housing 20 and these ends have portions of piston type inlet valve housings 60 extending therefrom for a purpose later described. The opposite ends of the control valves 54 and 55 have adjusting screws 61 as is the usual practice.

In the form of the valves illustrated each has a pair of spaced ears 62 and 63 (Fig. 3) extending forwardly therefrom substantially in the vertical line of the valves and opening 24. Pivotally mounted between the ears by pins 64 and 65 are levers 66 and 67 and provided on their free ends are brackets 68 and 69 having spaced arms 70 and 71 and 72 and 73 respectively. Pins 74 and 75 are supported on the spaced arms and extend therebetween to pivotally mount rollers 76 and 77.

The head 37 (Fig. 3) on the bolt 35 has a shank portion 78 having an annular groove 79 into which extend pins 80 mounted on the lower portions of spaced arms 81 and 82 which extend upwardly and terminate substantially even with the roller 76 on the bracket 68. The upper ends of the arms are connected by a spacer 83 having an opening therein adapted to receive a bolt or the like 84 provided with a head 85 on its other end adapted to contact the roller 76 as will later be described.

Spaced inwardly from the bolt 84 between the arms 81 and 82 is a spacer member 86 connecting said arms and having an opening adapted to receive a bolt 87 on the other end of which is a head 88 adapted to engage the roller 77 on the bracket 69. The spacer members 83 and 86 connect the arms 81 and 82 whereby they operate as one lever. Spaced substantially midway between the bolts 84 and 87 and extending through said arms 81 and 82 is a pin 89 for pivotally mounting of the arms 81 and 82 to an arm 90 to which is rigidly secured a plate 91 which is mounted between and supported by the sides 22 and 22'. The plate has threaded openings adapted to receive the threaded shanks of bolts or the like 92 which carry on their outer ends a clamping or retaining plate 93. The cable 11 is inserted between the plates 91 and 93 and by tightening of the bolts 92 the cable will be rigidly clamped therebetween. The plate 93 has its lower end radiused as at 94 for easier outwardly bending of the cable accomplished by the shaft 35 and head 37 as later described.

Rotatably mounted between brackets 95 in the lower end of the housing 20 on a shaft 96 is a bearing member 97 and suitably secured to its outer race is an outwardly extending arm 98. Rigidly mounted upon the outer end of said arm is a plate 99 also having threaded openings adapted to receive the threaded shanks of bolts 100 which carry on their outer ends a clamping or retaining plate 101 for the cable 11 similar to plate 93 on bolts 92 with the exception that the lower cable clamping device will swing up and down within the opening 24 with rotation of the bearing member 97 as the cable is bent outwardly as shown in Fig. 4.

Referring to Fig. 7, 102 designates a main air line from a source of pressure supply such as a compressor and tank (not shown) having a branch line 103 leading to a master control valve or high capacity pressure regulator 104, which may be of any suitable conventional structure. An example of a suitable regulator is diagrammatically illustrated in Fig. 9 wherein the particular embodiment is substantially the same as the control valve 55, Fig. 10, with the addition of a lever and cam for adjusting the position of the piston type inlet valve housing. The structure per se of the regulator 104 forms no part of the present invention. A branch line 105 leads to a graduated pressure regulating relay valve 106, and a branch line 107 leads to a second graduated pressure regulating relay valve 108. The relay valves 106 and 108 may be of any suitable relay or pressure amplifying valves and an example of such a suitable conventional relay valve is illustrated in Fig. 8, however, the structure per se of said valves is not the subject of the present invention. Valves 106 and 108 are vented as is the usual practice making them in effect three-way valves. The air line 102 has branch lines 109 and 110 leading to inlets of the control valves 54 and 55 as indicated at 111 and 112. An air line 113 connects valve 54 with the graduated pressure regulating relay valve 106. Air line 114 connects the valve 108 with the outlet of the valve 55. A line 115 connects the master control valve or pressure regulator 104 with the diaphragm cylinder 29 for supplying desired pressure against the side of the diaphragm. The valve 104 is provided with vents for bleeding air from the diaphragm cylinder as will later be described.

In order to provide for operating the brake (not shown) for the cable drum to hold or pay out the cable to the well hole, we provide an air cylinder 116 having one end pivotally connected to a bracket 117 as indicated at 118 and having a piston rod 119 extending from the lower end thereof and pivotally connected by a bracket 120 through arm 121 which is secured to a lever 122 having one end rigidly secured to a shaft 123 and having an arm 124 to which is attached a suitable rod 125 leading to the braking mechanism (not shown) connected to the cable drum as is the usual practice. The arm or lever 122 is of substantial length with the end provided with a suitable shaped handle 126 (Fig. 1) for an operator to hold and apply power by said lever 122 in manual operating of the cable brake mechanism when desired.

An air line 127 connects the graduated pressure regulating relay valve 106 with the cylinder 116 at its upper end or the upper stroke side of the piston and a line 128 connects the valve 108 with the lower end of the cylinder 116.

The master control valve 104 and valves 106 and 108 are enclosed within a housing 129 which may be mounted near the control box 18 and has gauges on the outside thereof as indicated at 130, 131 and 132. A control lever 133 is provided for the master valve. A double line three-way valve 134 having a control lever 135 is interposed in the lines 127 and 128 between the relay valves 106 and 108 and the cylinder 116. The valve 134 is of conventional structure and is such that it normally provides for communication from the valves 106 and 108 through the lines 127 and 128 respectively to the cylinder. When it is desired to use the hand brake lever 126 the lever 135 is moved to operate the valve 134 whereby the lines to the valves 106 and 108 are closed and the lines 127 and 128 from the cylinder 116 are vented to the atmosphere thereby removing all pressure from the cylinder 116 which would otherwise resist operation of the hand brake lever 126.

The master control valve 104 in the form illustrated in Fig. 9 has a lever 133 positioned for application of pressure to the diaphragm 45 and movement of the lever clockwise, Fig. 9, will decrease the applied pressure, as the cam 136 will allow the inlet valve housing 137 to move upwardly. The full air supply pressure is delivered through the line 103 to the inlet chamber 138 to apply said pressure to the top of the upper or inlet valve 139. The control valve is preferably preloaded by adjusting the screw 140 to compress the spring 141, the spring pressure being applied against the diaphragm 142. When the lever 133 is moved to apply pressure to the diaphragm, the cam 136 compresses the inlet valve spring 143 and forces the inlet valve housing 137 downwardly unseating the inlet ball valve 139. The supply air then flows from the inlet chamber 138 into the supply chamber 144 and through the line 115 to the diaphragm 45. The supply air also flows to the chamber 145 above the diaphragm 142, and when the pressure on the diaphragm 45 reaches the setting called for by the position of the lever 133, the diaphragm 142 is forced downwardly against the spring 141 until a balance between the air pressure and spring force is achieved. This allows the inlet valve spring to seat the inlet valve 137 cutting off further flow of air through the line 115. When the lever 133 is moved to decrease the pressure acting on the diaphragm 45, the inlet and exhaust valve unit is moved upward by the exhaust spring 146 and the inlet ball valve 139 is held on its seat by the inlet valve spring. The lower ball valve is unseated. Excess pressure in the line 115 is then vented to the atmosphere through the passage 147 and vent opening 148. When the controlled pressure is reduced to the setting called for by the lever position, the diaphragm is forced upward by its spring to a balanced position between the air pressure and spring force. The exhaust valve spring is compressed and the lower ball is returned to its seat. This cuts off further venting of control pressure. The valve automatically compensates for leakage and temperature variations. If the pressure on the diaphragm 45 should decrease with no change in the position of the lever 133, the diaphragm spring will move the diaphragm and exhaust valve seat upward. This will open the inlet ball valve and restore the pressure called for by the lever position. If the pressure on the diaphragm 45 should increase, the diaphragm and exhaust valve seat will be moved away from the lower ball valve and excess pressure will vent to atmosphere restoring the proper controlled pressure on the diaphragm 45.

In the control valves 54 and 55, example of which is illustrated in Fig. 10, the screw 149 is adjusted to preload the diaphragm spring 150. The air line branch 110 supplies the air pressure to the inlet chamber onto the inlet valve 151. The movement of the inlet valve housing 152 is controlled by the lever 67 which is actuated by the movement of the arms 81 and 82. When the cable 11 straightens, as illustrated in Fig. 3, the arms 81 and 82 move the lever 67 to force the inlet valve housing 152 inwardly unseating the inlet valve 151 whereby the air pressure from the inlet 112 into the delivery chamber 153 and through the line 114. Said air pressure is also applied to the diaphragm chamber 154. As the air pressure on the diaphragm 155 increases, the diaphragm will be forced toward the spring 150 compressing same until a balance between the air pressure and spring force is achieved. This allows the inlet valve spring to seat, the inlet valve cutting off further flow into the delivery line 114. When the arms 81 and 82 are moved into the position shown in Fig. 4, or brake applying position, the lever 67 allows the inlet spring housing to move toward said lever with the inlet ball valve held on its seat by said inlet valve spring. This lifts the exhaust valve 156 from the exhaust valve seat, thus venting the excess pressure in the line 114 to the atmosphere through the passage 157 and vents 158. When the pressure in the delivery chamber 153 has decreased to the desired pressure in accordance with the position of the arms 81 and 82, the diaphragm spring will move the diaphragm and the exhaust valve seat against the exhaust valve cutting off further venting of excess pressure to atmosphere. In other words, the air pressure supplied through the line 114 is increased or decreased in accordance with the position of the arms 82. While the numerals designating the parts of the valve illustrated in Fig. 10 refer to the control valve 55, the structure and operation of valve 54 is the same, but due to the relative positioning of the valve 54 movement of the arms 81 and 82 toward the position shown in Fig. 3 lowers the control pressure in the line 113 and movement of the arms 81 and 82 toward the position shown in Fig. 4 increases the control pressure in the line 113. When the arms 81 and 82 are in an intermediate position between those illustrated in Figs. 3 and 4, both the inlet and exhaust valves are closed and the pressures in lines 113 and 114 are equal.

The relay or pressure amplifying valves 106 and 108 are preferably the same structure and an example of a suitable valve is illustrated in Fig. 8. It is preferable that the pressure amplification be in the order of a ratio of 3 to 1 to provide the desired power in the system. In the valve 106 the air line branch 105 has communication with the inlet 159 and the line 127 has communication with the outlet 160. The body of the valve 106 has a chamber 161 and a chamber 162 on opposite sides of a diaphragm assembly 163. The signal air is supplied through the line 113 which communicates with the chamber 161. The chamber 162 communicates through a small passage of tube 164 with the outlet chamber 160 whereby said pressure in the outlet chamber is applied to the diaphragm assembly 163. When the signal pressure through the line 113 is increased, the diaphragm assembly 163 is forced downwardly and through the relief valve 165, connecting tube 166, the valve assembly 167 is forced downwardly to unseat same whereby air will flow from the inlet chamber 159 to the outlet chamber 160 and through the line 127 to the cylinder 116 until the pressure in the line 127 and applied through the tube 164 to the chamber 162 arrives at a pressure necessary to balance the diaphragm 163 to close the valve 167. If the pressure supplied through the line 113 to the chamber 161 is decreased, the pressure in the chamber 162 which is the same as the pressure in the line 127 unbalances the diaphragm 163 to move same upwardly to open the relief valve 165 whereby air pressure is bled from the chamber 160 through the relief valve opening, raising the relief poppet assembly 168 whereby said air is bled through the ports 169, 170 and 171 to the atmosphere until the pressures acting on the diaphragm 163 are again in balanced position to effect closing of the relief port.

The pressure in the inlet chamber 159 acts on a balanced diaphragm 172 and a pilot diaphragm 173 is acted on by pressure in a pilot chamber 174 which communicates through passage 175 with the space between the relief valve 165 and the relief poppet assembly 168. Valves 106 and 108 are of the same structure and in accordance with the designed ratio of pressure amplification, increase of pressure through the line 13 effects a corresponding ratio of increase of pressure in the line 127 and a decrease in pressure in the line 113 effects a decrease of the pressure in the line 127 in accordance with said ratio.

In operation of an apparatus constructed and assembled as described the weight of the drill stem and drill bit will be placed on the cable 11 and by operation of the master control valve 104 the air under pressure from line 102 will be supplied from the valve 104 through line 115 and provide a desired pressure acting on the diaphragm 45 in the diaphragm cylinder 29 to move the plate 39 and bolt 35 outwardly against the tension of the spring 44 sleeved on the bolt 35 thus pushing the bolt outwardly with the head 37 engaging against the cable 11 to set the cable at substantially an angle as at 136. The relative weight of the drill stem and tools is determined by the pressure shown on a gauge (not shown) usually present in drilling apparatus of this character.

The piston diaphragm is then set by setting of the master valve 104 to maintain a constant pressure in the diaphragm cylinder. The amount of air pressure to be applied to the diaphragm 45 is determined by the weight of the drill stem and tools on the cable 11 and by the pressure necessary to overcome the tendency to hold the cable straight whereby the cable is forced outwardly by operation of the diaphragm to form a slight bend as shown in Fig. 7. In starting the operation the hand brake lever is moved to apply the brake on the cable drum, the valve 134 is then opened to apply pressure to the cylinder 116 in accordance with the control pressure of the system. The operator can feel when the air pressure takes over the controls and the lever 126 is then released. The master valve or pressure regulator 104 is then further adjusted or regulated according to the necessary air pressure on the diaphragm cylinder to maintain the desired weight of tools on the cable and the drill weight on the formation being drilled and when the necessary air pressure is reached the brake will be set and the air balanced on either side of the piston in the cylinder 116. After the brake is properly set the master valve is then set so the air pressure in the cylinder 116 and diaphragm cylinder 29 is maintained.

As the formation is cut away, a greater portion of the weight will be supported by the cable 11 and straightens the same as shown in Fig. 3, thus forcing the head 37 on the piston bolt 35 inwardly against the air pressure in the diaphragm cylinder, the air from diaphragm 29 being bled off from the master valve 104 to atmosphere in order to maintain constant force against cable 11. As the diaphragm cylinder 29 moves inwardly the arms 81 and 82 move due to the connection with the head, and through the connection 87 and head 88 thereof and the roller 77 on the bracket 69 which is in contact with the inlet valve housing 59 of the control valve 55 as shown in Fig. 3 will move said inlet valve housing inwardly whereby air will flow through the line 102, branch 110, valve 55, line 114 to the relay valve 108 increasing the pressure in chamber 161 thereof to open the valve whereby air will flow from line 102 through branch 107, valve 108 and line 128 to the lower part of the cylinder 116 increasing the pressure acting on the lower end of the piston therein proportionately to the increase of the signal pressure in the line 114. At the same time when the lower portion of the arms 82 pivotally mounted on pin 89 is moved inwardly, the upper portion will move outwardly and through the head 85 of the bolt 84 and the roller 76 the inlet valve housing 58 of the valve 54 moves outwardly to open the exhaust valve 156 to bleed the air pressure from the line 113 and vent same to atmosphere through the vents 158 until the pressure in line 113 and diaphragm chamber 154 is lowered whereby the force acting on said diaphragm 155 is balanced and the exhaust valve seated. This causes the air pressure in line 113 and the chamber 161 of the relay valve 106 to be lowered thus causing actuation of the diaphragm 163 in the relay valve 106 to move and open the relief valve 165 to vent air from the line 127 and upper portion of the cylinder 116 until the pressure therein is lowered proportionately to the signal pressure in line 113. This change in pressure acting on the piston in the cylinder 116 moves the plunger rod 119 upwardly actuating the lever 122 to move the brake on the cable drum by lessening the force thereon whereby the drum rotates to pay more cable therefrom.

It will be obvious that the change of air pressure is small and the brake on the drum will apply only sufficient pressure to retard rotation of the drum whereby a desired portion of the weight of the drill string will be on the cable and allow constant rotation of the drum as the formation is cut away thus causing smooth operation of the apparatus and eliminate jerking of the cable and tools. The air is so balanced that slight change in signal pressures on the diaphragms of the relay valves due to change in angle of the cable will cause operation of the cylinder to maintain a necessary force on the cable drum brake.

As the brake is released and cable payed out from the drum the weight on the cable will decrease and the head 37 connected to the diaphragm 45 will move farther outwardly as shown in Fig. 4 to carry with it the arms 82 to actuate the control valves 54 and 55 lowering the signal pressure from the control valve 55 and in line 114 and increase the signal pressure from the control valve 54 as shown in Fig. 4 thus causing additional pressure on line 113. This reverses the actuation of the relay valves 106 and 108 whereby additional air will move through line 105, valve 106 and line 127 to the upper side of the cylinder 116 and air on the lower side of said cylinder will be vented through line 127 and valve 165 of the relay valve 108 to move the plunger downwardly with the lever 122 to increase the brake pressure and slow down or stop outpay of the cable 11.

At the time of movement of the head 37 inwardly and outwardly thus moving the cable, the cable clamps 99 and 101 on the arm 98 will move or pivot on the bearing 96 so that there will be no undue strain on the cable or parts of the control mechanism through the shortening and lengthening of the distance between the upper and lower clamping mechanisms in response to straightening and bending of said cable therebetween.

It will be obvious that with the control mechanism as above described the varying weight on the drilling tools will apply a varying tension on the cable 11 which due to the constant pressure on the diaphragm cylinder with its piston head will move the arms 81 and 82 to operate the control valves 54 and 55 and vary the air pressure in lines 113 and 114 to operate the relay valves 106 and 108 which in turn actuate the piston in the cylinder 116 to automatically increase or slow down the paying out of the cable as it is necessary to lengthen the same during the drilling operation. After the master valve 104 is set for the desired weight on the tools then no further mechanical operation is necessary to pay out the cable.

In Fig. 11, we have shown a modified form of control unit wherein only one control valve is used and a reversing relay valve is utilized instead of the volume booster relay as in the preferred form. Fig. 11 of the drawings will carry the same numerals as in the preferred form wherever those parts are the same.

It will be noted in this form of invention the head 37 has arms 175 with pins slidably engaged in the annular groove 79 and it is pivoted on an arm 176 secured to a plate 177 mounted between the side walls of the housing 20 of the control unit, the arms 175 being pivoted to the arm 176 by pin 178.

The cross plate 177 forms one-half of the clamp members for the upper clamp portion on the cable and the outer plate 179 is secured thereto by bolts as indicated at 180, the plate 179 being radiused as indicated at 181 to allow for bend of the cable 11 as illustrated.

The valve 54 with its housing extension 182 is mounted in the housing 20 and has the same connection with the arm 175 and is like numbered as in the preferred form of the invention.

183 designates a reversing relay valve and a line 184 connects the outlet of the valve 54 with the valve 108. A branch line 185 leads from the line 184 to the reversing relay valve 183. A main air line 186 leads from a source of supply (not shown) and is connected directly to the inlet of the valve 54 for supply of air to the control valve 54. A branch line 187 leads from the line 186 to the master valve 104 and also to the inlet of the reversing relay valve 183. A line 188 connects the master valve with the diaphragm cylinder 29 as in the preferred form of the invention. A line 127 leads from the outlet of the relay valve 108 to the upper portion of the cylinder 116 through the three-way valve 134 and a line 189 leads from the downstroke side of the cylinder 116 through the three-way valve 134 to the outlet of the reversing relay valve 183.

The reversing relay valve 183 is of suitable conventional structure and the structure per se forms no part of the present invention. An example of a suitable structure of reversing relay valves is illustrated in Fig. 12. The branch line 185 communicates the signal pressure from the control valve 54 to a diaphragm chamber 190 which acts on a diaphragm 191 whereby increase in signal pressure against said diaphragm overcomes the pressure exerted by the diaphragm spring 192 to permit opening of the relief valve 193 to vent air from the outlet chamber 194 that communicates with the line 189, and decrease in the signal pressure causes the unbalancing of the spring pressure and air pressures whereby through the connecting tube 195 and valve assembly 196 said valve assembly is opened for flow of air from the line 186 through the valve opening to the discharge chamber 194 and line 189 to the cylinder. In the form of reversing relay valve illustrated, the spring pressure is adjustable by a screw 196. The pilot diaphragm at the lower end of the valve is the same as in the relay valve 106.

In operation of this form of the invention setting of the master valve by adjustment thereof with the weight on the cable is the same as in the preferred form of the invention by submission of air to the diaphragm of the diaphragm cylinder. It will be noted in Fig. 11 the head 37 is extended outwardly which creates a substantial bend in the cable 11 which indicates more weight of the tools are on the formation. As the formation is cut away, and the weight on the cable increased, the head 37 will be pushed towards the diaphragm cylinder 29 and the plate 39 against the pressure therein, the pressure acting on said diaphragm being maintained constant through bleeding in valve 104 and at the same time the upper end of the arm 175 will move outwardly to permit the inlet valve in the control valve 54 to open for increase of air pressure in line 184 to increase and thus operate the relay valve 108 and reversing relay valve 183, to increase the pressure delivered through line 127 to the piston in cylinder 116 and decrease the pressure delivered to said cylinder through line 189 for operation of the brake mechanism for paying out additional cable. In the form of invention shown in Fig. 11, the reversing relay valve 183 and the valve 108 act in unison to allow the air to move backwards and forward in lines 127 and 189 depending upon the movement of the arm 175 which will vary the signal pressure or flow of air in lines 184 and 185 from the valve 54. In other words when relay valve 183 acts to lower pressure in line 189, valve 108 acts to increase pressure in line 127 to operate the piston in the cylinder 116 to increase pressure of the brake on the drum and slow down or stop paying out of the cable.

It will be obvious from the foregoing that we have provided an improved apparatus for controlling pay of drilling cable in a drilling rig for automatic operation thereof.

What we claim and desire to secure by Letters Patent is:

1. Apparatus for automatically feeding drilling tools suspended from a cable reeved over a crown block of a derrick and connected to said tools, said cable having one end secured to the derrick floor and the other end to a drum for winding the cable thereon comprising, a control unit for attachment to said cable, said unit including a cylinder having a diaphragm therein and a rod connected to said diaphragm, a head on said rod for engaging against said cable, a master valve for adjusting pressure of fluid to said diaphragm cylinder, a fluid supply, means for supplying fluid from the fluid supply to said master valve and to said diaphragm cylinder, control valves in said unit, means supplying fluid from the fluid supply to said control valves, an arm connected to said head and having connection with the control valves in the unit for alternately operating said valves upon movement of the head by change of weight on the cable, brake means connected to said cable, means including a cylinder and piston movable between the ends of the cylinder and having connection with said brake means, a pair of relay valve means having connection with the means for supplying fluid to the valves in the unit and respectively to opposite ends of said cylinder for automatically controlling the supply of fluid to the respective ends of said cylinder, and means fluidly connecting the control valves and relay valve means for supplying signal pressure thereto for actuating same whereby change in weight on the cable will change the angle of the cable in the control unit to operate the control valves to change the signal pressure to the relay valve means and fluid supply from said relay valve means to operate the cylinder thereby braking or releasing of cable on the drum.

2. Apparatus for automatically feeding drilling tools suspended from a cable reeved over a crown block of a derrick and connected to said tools and operable from a fluid supply, said cable having one end secured to the derrick floor and the other end to a drum for winding the cable thereon comprising, a control unit for attachment to said cable, control valves in said unit, means supplying fluid from the fluid supply to said control valves, said unit including a cylinder having a diaphragm therein and a rod connected to said diaphragm, a head on said rod for engaging against said cable, a master valve for maintaining pressure of fluid to said diaphragm cylinder, fluid supply lines for supplying fluid from the fluid supply to said master valve and to said diaphragm cylinder, means connected to said head having connection with the control valves in the unit for alternately operating said valves upon movement of the cable by change of weight thereon, brake means connected to said cable, means including a cylinder and piston having connection with said brake means, relay valve means, lines having connection with fluid supply lines and the relay valve means for supplying fluid to said relay valve means, means fluidly connecting the control valves with the relay valve means for supplying actuating power thereto, and lines connecting said relay valves with said cylinder whereby change in angle of the cable in the control unit will operate the control valves to supply power through the fluid connecting means to the relay valves to actuate some whereby fluid supplied to said relay valve means will be communicated to the cylinder and piston to operate same to cause braking or release of cable from said drum.

3. Apparatus for automatically feeding drilling tools suspended from a cable reeved over a crown block of a derrick and connected to said tools and operable from a fluid supply such as air, said cable having one end secured to the derrick floor and the other end to a drum for winding the cable thereon comprising, a control unit for attachment to said cable, control valves in said unit, said control valves including housings, means supplying fluid from the fluid supply to said control valves, said unit including a cylinder having a diaphragm therein and a rod connected to said diaphragm, a head on said rod for engaging against said cable, an arm connected to said rod adjacent said head and having movable contact with said control valves in the unit for alternately operating said valves upon movement of the cable by change of weight thereon, a master valve for maintaining pressure of fluid to said diaphragm cylinder, means for supplying fluid from the fluid supply to said master valve and from the master valve to said diaphragm cylinder, brake means connected to said cable, a brake lever having connection with said brake means whereby movement of the brake lever controls actuation of said brake means, a cylinder and piston having connection with the brake lever, relay valves having connection with the means for supplying fluid to the master valve, lines connecting the relay valves to the control valves whereby the relay valves are operated in response to operation of the control valves, lines connecting the relay valves with said cylinder and piston for automatically controlling the supply of fluid to said cylinder upon movement of the head by the cable and operation of the control valves, and valve means in said lines connecting the relay valves with the cylinder and operable to close said lines from the relay valves and open the lines from the cylinder to atmosphere for freeing the brake lever from control by said fluid from the relay valves.

4. Apparatus for automatically feeding drilling tools suspended from a cable reeved over a crown block of a derrick and connected to said tools and operable from a fluid supply such as air, said cable having one end secured to the derrick floor and the other end to a drum for winding the cable thereon comprising, a control unit for attachment to said cable, control valves in said unit, said control valves including housings, means supplying fluid from the fluid supply to said control valves, said unit including a cylinder having a diaphragm therein and a rod connected to said diaphragm, a head on said rod for engaging against said cable, an arm connected to said rod adjacent said head and having movable contact with said control valves in the unit for alternately operating said valves upon movement of the cable by change of weight thereon, a manually adjusted pressure regulator, means for supplying fluid pressure from the fluid supply to said pressure regulator and from said pressure regulator to the diaphragm cylinder, brake means connected to said cable, a brake lever having connection with said brake means whereby movement of the brake lever controls actuation of said brake means, a cylinder and piston movable between the ends of the cylinder and having connection with the brake lever, a pair of graduated pressure regulating relay valves with each having an inlet connected with the fluid pressure supply, one of said graduated pressure regulating relay valves having an outlet in fluid communication to one end of the cylinder and the other having an outlet in fluid communication to the other end of said cylinder, each of said relay valves having a fluid power actuated member for operating the valve whereby the pressure from the respective outlet is a multiple of the actuating fluid power pressure, means fluidly connecting a control valve with the one said relay valve for supplying actuating power to the fluid power actuated member thereof, means fluidly connecting the other control valve with the other of said relay valves for supplying actuating power to the fluid power actuating member thereof whereby change in weight on the cable will change the angle of the cable in the control unit to operate the control valves and change the actuating fluid power to the relay valves and the fluid supply from the relay valves to operate the cylinder and piston thereby braking or releasing of cable from said drum, and valve means operable to close the outlets from the relay valves and open the cylinder ends to atmosphere for freeing the brake lever from control by said fluid from the relay valves.

References Cited in the file of this patent
UNITED STATES PATENTS

| | | |
|---|---|---|
| 2,117,078 | Brauer | May 10, 1938 |
| 2,455,917 | Crake | Dec. 14, 1948 |
| 2,659,574 | Crookston | Nov. 17, 1953 |
| 2,659,575 | Seljos | Nov. 17, 1953 |